US010445332B2

(12) United States Patent
Indyk et al.

(10) Patent No.: US 10,445,332 B2
(45) Date of Patent: Oct. 15, 2019

(54) METHOD AND SYSTEM FOR PROVIDING DOMAIN-SPECIFIC INCREMENTAL SEARCH RESULTS WITH A CUSTOMER SELF-SERVICE SYSTEM FOR A FINANCIAL MANAGEMENT SYSTEM

(71) Applicant: Intuit Inc., Mountain View, CA (US)

(72) Inventors: Benjamin Indyk, San Diego, CA (US); Igor A. Podgorny, San Diego, CA (US); Todd Frey Goodyear, San Diego, CA (US); Pravin Bhutada, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 392 days.

(21) Appl. No.: 15/278,428

(22) Filed: Sep. 28, 2016

(65) Prior Publication Data
US 2018/0089283 A1 Mar. 29, 2018

(51) Int. Cl.
*G06F 16/248* (2019.01)
*G06F 16/9535* (2019.01)
(Continued)

(52) U.S. Cl.
CPC ........ *G06F 16/248* (2019.01); *G06F 16/9535* (2019.01); *G06N 7/005* (2013.01); *G06Q 10/067* (2013.01); *G06F 16/90332* (2019.01)

(58) Field of Classification Search
CPC combination set(s) only.
See application file for complete search history.

(56) References Cited

U.S. PATENT DOCUMENTS 5,471,382 A 11/1995 Tallman et al.
5,519,608 A 5/1996 Kupiec
(Continued)

FOREIGN PATENT DOCUMENTS

CN 101520802 4/2009
EP 2159715 3/2010
(Continued)

OTHER PUBLICATIONS

Dror, et al., "From Query to Question in One Click: Suggesting Synthetic Questions to Searchers," International World Wide Web Conferences Steering Committee, May 13, 2013, pp. 391-401.
(Continued)

*Primary Examiner* — Shyue Jiunn Hwa
(74) *Attorney, Agent, or Firm* — Hawley Toxell Ennis & Hawley LLP; Philip McKay

(57) ABSTRACT

Disclosed methods and systems provide domain-specific incremental search results for search query terms with a customer self-service system for a financial management system, according to one embodiment. Incremental search results are search results that are generated for search query terms, as a user enters the search query terms as part of a search query to a customer self-service system, according to one embodiment. The customer self-service system receives search query terms (e.g., a partial search query) in a search text box, searches customer self-service system content for content that is relevant to the search query terms, and provides incremental search results in a results text box (e.g., drop down menu) that is proximate to (e.g., below) the search text box, according to one embodiment.

29 Claims, 7 Drawing Sheets

(51) Int. Cl.
G06N 7/00 (2006.01)
G06Q 10/06 (2012.01)
G06F 16/9032 (2019.01)

(56) References Cited

U.S. PATENT DOCUMENTS

| | | | |
|---|---|---|---|
| 6,147,975 | A | 11/2000 | Bowman-Amuah |
| 6,601,055 | B1 | 7/2003 | Roberts |
| 7,013,263 | B1 | 3/2006 | Isaka et al. |
| 7,222,078 | B2 | 5/2007 | Abelow |
| 7,385,716 | B1 | 6/2008 | Skaanning |
| 7,594,176 | B1 | 9/2009 | English |
| 7,685,144 | B1 | 3/2010 | Katragadda |
| 7,974,860 | B1 | 7/2011 | Travis |
| 8,200,527 | B1 | 6/2012 | Thompson et al. |
| 8,311,792 | B1 | 11/2012 | Podgorny et al. |
| 8,341,167 | B1 | 12/2012 | Podgorny et al. |
| 8,484,228 | B2 | 7/2013 | Bhattacharyya et al. |
| 8,645,298 | B2 | 2/2014 | Hennig et al. |
| 8,660,849 | B2* | 2/2014 | Gruber ............... G06F 17/3087 704/275 |
| 8,817,968 | B1 | 8/2014 | Boutcher et al. |
| 8,892,539 | B2 | 11/2014 | Anand et al. |
| 8,909,568 | B1 | 12/2014 | Mann et al. |
| 8,943,145 | B1 | 1/2015 | Peters et al. |
| 8,983,977 | B2 | 3/2015 | Ishikawa et al. |
| 9,015,031 | B2 | 4/2015 | Ferrucci et al. |
| 9,060,062 | B1 | 6/2015 | Madahar et al. |
| 9,063,983 | B1 | 6/2015 | Lee |
| 9,247,066 | B1 | 1/2016 | Stec et al. |
| 9,336,211 | B1 | 5/2016 | Bousquet et al. |
| 9,336,269 | B1 | 5/2016 | Smith et al. |
| 9,342,608 | B2 | 5/2016 | Cook et al. |
| 9,460,191 | B1 | 10/2016 | Gaucher et al. |
| 9,471,883 | B2 | 10/2016 | Chatterjee et al. |
| 9,582,757 | B1 | 2/2017 | Holmes et al. |
| 9,633,309 | B2 | 4/2017 | Giffels et al. |
| 9,779,388 | B1 | 10/2017 | Hansen et al. |
| 9,887,887 | B2 | 2/2018 | Hunter et al. |
| 9,892,367 | B2 | 2/2018 | Guo et al. |
| 9,910,886 | B2 | 3/2018 | Adams, Jr. et al. |
| 10,002,177 | B1 | 6/2018 | McClintock et al. |
| 10,083,213 | B1 | 9/2018 | Podgorny et al. |
| 10,134,050 | B1 | 11/2018 | Hung et al. |
| 10,147,037 | B1 | 12/2018 | Podgorny et al. |
| 10,162,734 | B1 | 12/2018 | Podgorny et al. |
| 2002/0111888 | A1 | 8/2002 | Stanley et al. |
| 2002/0111926 | A1 | 8/2002 | Bebie |
| 2002/0123983 | A1 | 9/2002 | Riley et al. |
| 2002/0169595 | A1 | 11/2002 | Agichtein et al. |
| 2003/0099924 | A1 | 5/2003 | Tsuboi et al. |
| 2003/0144873 | A1 | 7/2003 | Keshel |
| 2004/0024739 | A1 | 2/2004 | Copperman et al. |
| 2005/0114327 | A1 | 5/2005 | Kumamoto et al. |
| 2006/0085750 | A1 | 4/2006 | Easton et al. |
| 2006/0265232 | A1 | 11/2006 | Katariya et al. |
| 2007/0011131 | A1 | 1/2007 | Delefevre |
| 2007/0219863 | A1 | 9/2007 | Park et al. |
| 2007/0259325 | A1 | 11/2007 | Clapper |
| 2008/0189197 | A1 | 8/2008 | Allanson et al. |
| 2008/0208610 | A1 | 8/2008 | Thomas et al. |
| 2008/0215541 | A1 | 9/2008 | Li et al. |
| 2008/0294637 | A1 | 11/2008 | Liu |
| 2009/0012926 | A1 | 1/2009 | Ishikawa et al. |
| 2009/0119575 | A1 | 5/2009 | Velusamy |
| 2009/0162824 | A1 | 6/2009 | Heck |
| 2009/0248659 | A1 | 10/2009 | McCool et al. |
| 2009/0253112 | A1 | 10/2009 | Cao et al. |
| 2009/0265340 | A1 | 10/2009 | Barcklay et al. |
| 2010/0068687 | A1 | 3/2010 | Bertelsen |
| 2010/0070554 | A1 | 3/2010 | Richardson et al. |
| 2010/0076998 | A1 | 3/2010 | Podgorny et al. |
| 2010/0088262 | A1 | 4/2010 | Visel et al. |
| 2010/0185630 | A1 | 7/2010 | Cheng et al. |
| 2010/0191686 | A1 | 7/2010 | Wang et al. |
| 2010/0203492 | A1 | 8/2010 | Nibe et al. |
| 2010/0205550 | A1 | 8/2010 | Chen et al. |
| 2010/0235361 | A1 | 9/2010 | Chandran et al. |
| 2010/0241971 | A1 | 9/2010 | Zuber |
| 2010/0318919 | A1 | 12/2010 | Murphy et al. |
| 2011/0055699 | A1 | 3/2011 | Li et al. |
| 2011/0125734 | A1 | 5/2011 | Duboue et al. |
| 2011/0202472 | A1 | 8/2011 | Wan et al. |
| 2011/0231347 | A1 | 9/2011 | Xu et al. |
| 2011/0264569 | A1 | 10/2011 | Houseworth et al. |
| 2011/0282892 | A1 | 11/2011 | Castellani et al. |
| 2012/0005148 | A1 | 1/2012 | Horvitz et al. |
| 2012/0005219 | A1 | 1/2012 | Apacible et al. |
| 2012/0022983 | A1 | 1/2012 | Hughes et al. |
| 2012/0084120 | A1 | 4/2012 | Hirsch et al. |
| 2012/0084185 | A1 | 4/2012 | Ciaramitaro et al. |
| 2012/0084293 | A1 | 4/2012 | Brown et al. |
| 2012/0095976 | A1 | 4/2012 | Hebenthal et al. |
| 2012/0130910 | A1 | 5/2012 | Al-Alami |
| 2012/0130978 | A1 | 5/2012 | Li et al. |
| 2012/0136764 | A1 | 5/2012 | Miller et al. |
| 2012/0166438 | A1 | 6/2012 | Wu et al. |
| 2012/0219142 | A1 | 8/2012 | Gould |
| 2012/0233191 | A1 | 9/2012 | Ramanujam |
| 2012/0331052 | A1 | 12/2012 | Rathod |
| 2013/0019286 | A1 | 1/2013 | Barborak et al. |
| 2013/0054497 | A1 | 2/2013 | Garland et al. |
| 2013/0066693 | A1 | 3/2013 | Laird-McConnell et al. |
| 2013/0073390 | A1 | 3/2013 | Konig et al. |
| 2013/0110823 | A1 | 5/2013 | Su et al. |
| 2013/0111323 | A1 | 5/2013 | Taghaddos et al. |
| 2013/0117677 | A1 | 5/2013 | St. Jacques, Jr. |
| 2013/0282363 | A1 | 10/2013 | Fan et al. |
| 2013/0285855 | A1* | 10/2013 | Dupray ............... G01S 19/48 342/451 |
| 2013/0297553 | A1 | 11/2013 | Bierner |
| 2013/0304730 | A1 | 11/2013 | Zhou |
| 2013/0325992 | A1 | 12/2013 | McGann et al. |
| 2013/0339870 | A1 | 12/2013 | Tandra Sishtla et al. |
| 2014/0006012 | A1 | 1/2014 | Zhou et al. |
| 2014/0022328 | A1 | 1/2014 | Gechter et al. |
| 2014/0052606 | A1* | 2/2014 | Vasudevan ............ G06Q 40/025 705/38 |
| 2014/0075004 | A1 | 3/2014 | Van Dusen et al. |
| 2014/0088944 | A1 | 3/2014 | Natarajan et al. |
| 2014/0114822 | A1 | 4/2014 | Sharma et al. |
| 2014/0119531 | A1 | 5/2014 | Tuchman et al. |
| 2014/0172883 | A1 | 6/2014 | Clark et al. |
| 2014/0189829 | A1 | 7/2014 | McLachlan et al. |
| 2014/0195613 | A1 | 7/2014 | Ogilvie |
| 2014/0201045 | A1 | 7/2014 | Pai et al. |
| 2014/0222669 | A1 | 8/2014 | Novak et al. |
| 2014/0280070 | A1 | 9/2014 | George et al. |
| 2014/0308648 | A1 | 10/2014 | Jain |
| 2014/0316856 | A1 | 10/2014 | Williams et al. |
| 2014/0324856 | A1 | 10/2014 | Lahiani et al. |
| 2014/0337257 | A1 | 11/2014 | Chatterjee et al. |
| 2014/0372980 | A1 | 12/2014 | Verma et al. |
| 2015/0052087 | A1 | 2/2015 | Srinivasan et al. |
| 2015/0058380 | A1 | 2/2015 | Polonsky et al. |
| 2015/0088608 | A1 | 3/2015 | Cama et al. |
| 2015/0095267 | A1 | 4/2015 | Behere et al. |
| 2015/0120718 | A1 | 4/2015 | Luo et al. |
| 2015/0127587 | A1 | 5/2015 | Pinckney et al. |
| 2015/0139415 | A1 | 5/2015 | Skiba et al. |
| 2015/0229531 | A1 | 8/2015 | O'Sullivan et al. |
| 2015/0254785 | A1 | 9/2015 | Yang et al. |
| 2015/0324805 | A1 | 11/2015 | Skiba et al. |
| 2015/0363481 | A1* | 12/2015 | Haynes ............... G06Q 10/10 707/748 |
| 2015/0371137 | A1 | 12/2015 | Giffels et al. |
| 2016/0048772 | A1 | 2/2016 | Bruno et al. |
| 2016/0055234 | A1 | 2/2016 | Visotski et al. |
| 2016/0062980 | A1 | 3/2016 | Boguraev et al. |
| 2016/0103833 | A1 | 4/2016 | Sanders et al. |
| 2016/0148222 | A1 | 5/2016 | Davar et al. |
| 2016/0148321 | A1 | 5/2016 | Ciaramitaro et al. |
| 2016/0180470 | A1 | 6/2016 | Mascaro et al. |
| 2016/0189029 | A1 | 6/2016 | Giffels et al. |

(56) References Cited

U.S. PATENT DOCUMENTS

| | | |
|---|---|---|
| 2016/0196497 A1 | 7/2016 | Allen et al. |
| 2016/0217472 A1 | 7/2016 | Podgorny et al. |
| 2016/0283491 A1 | 9/2016 | Lu et al. |
| 2016/0306846 A1 | 10/2016 | Adams, Jr. et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0124184 A1 | 5/2017 | Podgorny et al. |
| 2017/0270159 A1 | 9/2017 | Wang et al. |
| 2017/0323233 A1 | 11/2017 | Bencke et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2019/0018692 A1 | 1/2019 | Indyk et al. |
| 2019/0018899 A1 | 1/2019 | Podgorny et al. |

FOREIGN PATENT DOCUMENTS

| | | |
|---|---|---|
| JP | 2014112316 | 6/2014 |
| WO | WO 2011/053830 | 5/2011 |

OTHER PUBLICATIONS

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the $33^{rd}$ Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Bartolome et al., "Processing Unstructured Voice of Customer Feedback for Improving Content Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

* cited by examiner

METHOD AND SYSTEM FOR PROVIDING DOMAIN-SPECIFIC INCREMENTAL SEARCH RESULTS WITH A CUSTOMER SELF-SERVICE SYSTEM FOR A FINANCIAL MANAGEMENT SYSTEM

BACKGROUND

Financial management systems are valuable tools that provide services that were previously available only through interaction with a human professional, or that were painfully attempted by oneself. Prior to the advent of financial management systems, a user (e.g., a small business owner) would be required to consult with an accountant or bookkeeper for services, and the user would be limited, and potentially inconvenienced, by the office hours during which the professional was available for consultation. Furthermore, the user might be required to gather paper copies of all relevant records and travel to the professional's physical location to relay the information to the professional to obtain the professional's assistance. Beyond the inconveniences of scheduling and travel, the user would also be at the mercy of the professional's education, skill, personality, and varying moods. All of these factors resulted in a user who was vulnerable to: human error, variations in human ability, and variations in human temperament.

A financial management system can provide benefits that human professionals are hard-pressed to provide, such as: not having limited working hours, not being geographically limited, and not being subject to human error or variations in human ability or temperament. Small business owners are typically not accountants, nor do they want to be. Small business owners typically interact with business management software out of necessity, while simply wanting to return to the task of running their business. A financial management system enables users to receive accountant-like services, without the pain points associated with traditional interaction with professionals. To provide these services, however, the financial management system can often present information, options, and/or terms to users that may result in the users having questions about their interactions with the financial management system.

Users who have unanswered questions often feel fear, uncertainty, and/or doubt about what they are doing or about what they are supposed to do. The users' feelings of fear, uncertainty, and/or doubt are further exacerbated when answers are difficult to find, when answers are deeply embedded into large amounts of other information (e.g., in a webpage), and/or when the answers are difficult to understand (e.g. written in accountant jargon). Feelings of fear, uncertainty, and/or doubt are inconsistent with satisfied/happy customers, and such feelings may cause customers to seek alternative solutions, ultimately resulting in the abandonment of use of the financial management system. Because financial management systems are adept at saving users time while providing feature-rich business management solutions, answering users' questions in a quick, easy to find, and easy to understand manner is beneficial for both the users and the service provider of the financial management system.

What is needed is a method and system for resolving the longstanding deficiencies in resolving users' questions in financial management systems, by providing domain-specific incremental search results with a customer self-service system for a financial management system, according to one embodiment.

SUMMARY

Embodiments of the present disclosure include a method and system for providing domain-specific incremental search results with a customer self-service system for a financial management system. Incremental search results are search results that are generated for search query terms based on the various information a financial management system stores about a user, as a user enters (e.g., in real-time) the search query terms as part of a search query to a customer self-service system, according to one embodiment. The incremental search results are specific to (the domain of) financial management systems and may include automated suggestions for additional search query terms that are specific to searching one or more financial management systems, according to one embodiment. The disclosed customer self-service system receives search query terms (e.g., a partial search query) in a search text box, searches customer self-service system content, transaction data, and/or user profile data for content that is relevant to the search query terms, and provides incremental search results in a results text box (e.g., drop down menu) that is proximate to (e.g., adjacent and below) the search text box, according to one embodiment. Generating and providing domain-specific incremental search results, in accordance with the disclosed embodiments, may solve many of the long-standing problems associated with assisting users in quickly resolving unanswered questions and/or concerns that may arise while managing personal or business transactions with one or more financial management systems (e.g., a business financial management system and a personal financial management system).

Providing domain-specific incremental search results (e.g., using search query terms from a partial or complete search query), in a results text box that is proximate to the search text box used to enter the search query terms, provides several benefits. Commercial search engines like Google® (as distinguished from domain-specific search engines) generate revenue by mixing, mingling, or placing search results in proximity to advertisements, even though it takes longer to find the search results and makes it more difficult to find the search results. By providing domain-specific incremental search results that are based on a partial search query, the customer self-service system helps the user answer the user's question even before the customer finishes entering the question, according to one embodiment. By providing domain-specific incremental search results that are based on a partial search query, the customer self-service system helps the user better formulate the user's question by seeing the potential search results of the current search query terms, according to one embodiment. By providing domain-specific incremental search results in a results text box that is proximate to the search text box, the customer self-service system enables a user to find the user's search results faster than embedding the search results in a webpage, according to one embodiment. By providing simplified (e.g., under a predetermined character count) incremental search results in a results text box that is proximate to the search text box, the customer self-service system helps the user easily understand and/or digest the content of the incremental searches, according to one embodiment. By including incremental search results that are based on the various information a financial management system stores about a user, the customer self-service system personalizes the incremental search results with the user's prior activity, which further increases the likelihood that the user receives that information that will/may satisfy the user's intent in forming a search query, according to one embodiment.

The customer self-service system uses one or more of a variety of techniques for generating the incremental search results, according to one embodiment. The customer self-service system determines one or more topics that are relevant to the search query terms, and returns the customer self-support content that is likely relevant (e.g., includes the same or similar topic(s)) to the determined one or more topics of the search query terms, according to one embodiment. The customer self-service system predicts one or more potential search queries that the user could formulate from the search query terms received, and returns the customer self-support content that is likely relevant to the predicted one or more complete search queries, according to one embodiment.

The customer self-service system provides a variety of content in the incremental search results, according to one embodiment. The incremental search results include, but are not limited to, definitions of terms (e.g., definitions of tax jargon), frequently asked questions ("FAQs"), acronym definitions, transaction data (e.g., a user's invoice history for a customer of the user), a form number, a book keeping or tax-specific date, answers to potential search queries, search query suggestions, and the like, according to one embodiment.

The customer self-service system uses transaction data acquired from one or more financial management systems, in combination with the customer self-service system content, to generate the incremental search results, according to one embodiment. The customer self-service system provides incremental search results that include transaction data (e.g., invoice amount of a prior client transaction) in response to potential search queries that are based on the search query terms, according to one embodiment. The customer self-service system determines which transaction data to include in the incremental search results by determining the topic of the search query terms and the topics of the transaction data and matching transaction data to the search query terms based on the relevance of the topics of the transaction data and the search query terms, according to one embodiment.

These and other embodiments of the customer self-service system are discussed in further detail below.

Providing domain-specific incremental search results for search query terms with a customer self-service system for a financial management system is not an abstract idea and allows for significant improvement to the fields of user experience, self-service systems, customer service, customer retention, business management, financial management, and domain-specific search engines, according to one embodiment. The present disclosure adds significantly to the concept of content searching by providing domain-specific incremental search results for search query terms with a customer self-service system for one or more financial management systems because the customer self-service system: reduces the amount of time users spend searching for an answer to a question; reduces the amount of time users spend locating an answer to a question in a user experience page; reduces the likelihood that a user will misunderstand an answer to a question; assists users in formulating a search query; and reduces the amount of time users spend entering a search query into a search text box, according to one embodiment. As a result, embodiments of the present disclosure allow for reduced use of processor cycles, memory, and power consumption, by reducing the time spent by users to search for answers among search results and by reducing time spent by users to repeatedly search for an answer to their question in computing environments, according to one embodiment. Consequently, computing and communication systems implementing and/or providing the embodiments of the present disclosure are transformed into more operationally efficient devices and systems.

In addition to improving overall computing performance, providing domain-specific incremental search results for search query terms with a customer self-service system for a financial management system significantly improves the field of financial management systems, by reducing the amount of time that a user is removed from the operations tasks of running the user's business due to delays caused by users' feelings of fear, uncertainty, and/or doubt, according to one embodiment. Furthermore, by providing domain-specific incremental search results for search query terms with a customer self-service system for a financial management system, the disclosed embodiments help maintain and/or build trust and therefore loyalty in the financial management system with which the customer self-service system is associated, which results in repeat customers, and reduced abandonment of use of the financial management system, according to one embodiment.

Figure 1A:
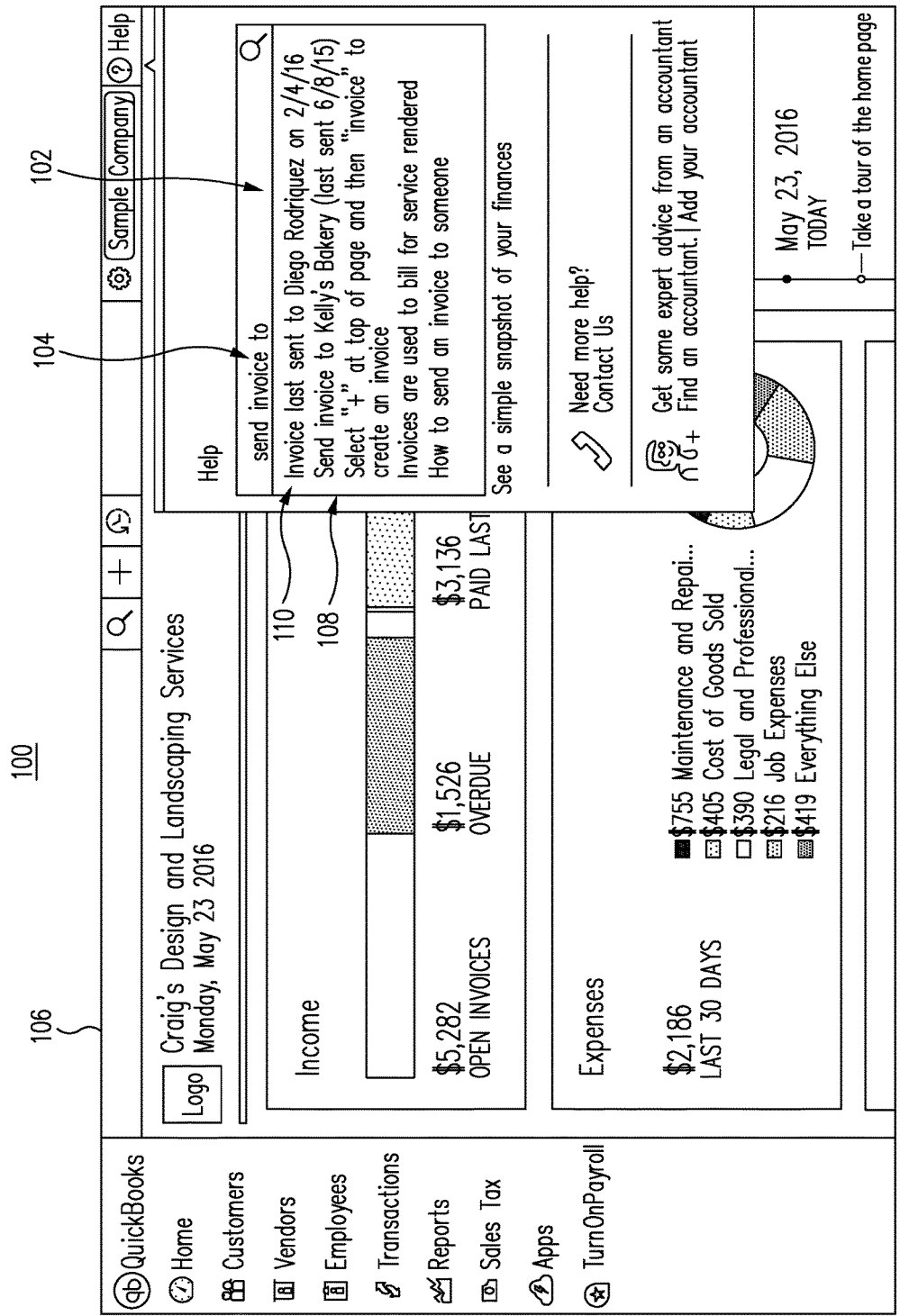
FIGS. 1A and 1B are diagrams of user experience pages for providing domain-specific incremental search results with a customer self-service system for a financial management system, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

The INTRODUCTORY SYSTEM, USER EXPERIENCE, ARCHITECTURE, and PROCESS sections herein describe systems and processes suitable for providing domain-specific incremental search results with a customer self-service system for a financial management system, according to various embodiments.

Introductory System

Financial management system users sometimes abandon in-product search and self-help (or self-service) services when the searching experience takes longer than expected. When a business owner (e.g., a small business owner) sets aside time to manage the business by creating/sending invoices, bills, receipts, payroll, tax submissions, etc., the business owner wants to efficiently complete the task in order to get back to substantive business operations. When a question arises or if particular information is sought, "time is money." That is, the longer it takes to find the answer or information, the more the business owner may incur lost opportunities (opportunity costs). Gathering paperwork, entering data, and trying to understand the jargon that is specific to accountants (account tracking/balancing) can hardly be avoided while operating one's business. However, natural feelings of frustration, uncertainty, and/or doubt can be amplified, when people are unable to find information or answers to questions that come up. Embodiments of the present disclosure predict/determine users' likely questions based on partial search queries (e.g., one or more search query terms), based on transaction data, and/or based on user profile data, and provide brief answers near (e.g., below) the search query text box, in real-time (e.g., as the users enter their search queries), according to one embodiment. In other words, a customer self-service system provides incremental search results right next to the search text box, as the users enter their search queries, according to one embodiment. With each addition or removal of a search query term, the customer self-service system modifies the incremental search results displayed for the user, to help the user quickly and conveniently find and understand the answer to their partial, potential, or completed search query, according to one embodiment.

Embodiments of the present disclosure include a method and system for providing domain-specific incremental search results with a customer self-service system for a financial management system. Incremental search results are search results that are generated for search query terms based on the various information a financial management system stores about a user, as a user enters (e.g., in real-time) the search query terms as part of a search query to a customer self-service system, according to one embodiment. The incremental search results are specific to (the domain of) financial management systems and may include automated suggestions for additional search query terms that are specific to searching one or more financial management systems, according to one embodiment. The disclosed customer self-service system receives search query terms (e.g., a partial search query) in a search text box, searches customer self-service system content, transaction data, and/or user profile data for content that is relevant to the search query terms, and provides incremental search results in a results text box (e.g., drop down menu) that is proximate to (e.g., adjacent and below) the search text box, according to one embodiment. Generating and providing domain-specific incremental search results, in accordance with the disclosed embodiments, may solve many of the long-standing problems associated with assisting users in quickly resolving unanswered questions and/or concerns that may arise while managing personal or business transactions with one or more financial management systems (e.g., a business financial management system and a personal financial management system).

Providing domain-specific incremental search results (e.g., using search query terms from a partial or complete search query), in a results text box that is proximate to the search text box used to enter the search query terms, provides several benefits. Commercial search engines like Google® (as distinguished from domain-specific search engines) generate revenue by mixing, mingling, or placing search results in proximity to advertisements, even though it takes longer to find the search results and makes it more difficult to find the search results. By providing domain-specific incremental search results that are based on a partial search query, the customer self-service system helps the user answer the user's question even before the customer finishes entering the question, according to one embodiment. By providing domain-specific incremental search results that are based on a partial search query, the customer self-service system helps the user better formulate the user's question by seeing the potential search results of the current search query terms, according to one embodiment. By providing domain-specific incremental search results in a results text box that is proximate to the search text box, the customer self-service system enables a user to find the user's search results faster than embedding the search results in a webpage, according to one embodiment. By providing simplified (e.g., under a predetermined character count) incremental search results in a results text box that is proximate to the search text box, the customer self-service system helps the user easily understand and/or digest the content of the incremental searches, according to one embodiment. By including incremental search results that are based on the various information a financial management system stores about a user, the customer self-service system personalizes the incremental search results with the user's prior activity, which further increases the likelihood that the user receives that information that will/may satisfy the user's intent in forming a search query, according to one embodiment.

The customer self-service system uses one or more of a variety of techniques for generating the incremental search results, according to one embodiment. The customer self-service system determines one or more topics that are relevant to the search query terms, and returns the customer self-support content that is likely relevant (e.g., includes the same or similar topic(s)) to the determined one or more topics of the search query terms, according to one embodiment. The customer self-service system predicts one or more potential search queries that the user could formulate from the search query terms received, and returns the customer self-support content that is likely relevant to the predicted one or more complete search queries, according to one embodiment.

The customer self-service system provides a variety of content in the incremental search results, according to one embodiment. The incremental search results include, but are not limited to, definitions of terms (e.g., definitions of tax jargon), frequently asked questions ("FAQs"), acronym definitions, transaction data (e.g., a user's invoice history for a customer of the user), a form number, a book keeping or tax-specific date, answers to potential search queries, search query suggestions, and the like, according to one embodiment.

The customer self-service system uses transaction data acquired from one or more financial management systems, in combination with the customer self-service system content, to generate the incremental search results, according to one embodiment. The customer self-service system provides incremental search results that include transaction data (e.g., invoice amount of a prior client transaction) in response to potential search queries that are based on the search query terms, according to one embodiment. The customer self-service system determines which transaction data to include in the incremental search results by determining the topic of the search query terms and the topics of the transaction data and matching transaction data to the search query terms based on the relevance of the topics of the transaction data and the search query terms, according to one embodiment.

As used herein, the term system (e.g., customer self-service system, financial management system, or other software system) includes, but is not limited to the following: computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of systems include, but are not limited to the following: QuickBooks®, available from Intuit, Inc. of Mountain View, Calif.; QuickBooks® Online™ (QBO), available from Intuit, Inc. of Mountain View, Calif.; Mint®, available from Intuit, Inc. of Mountain View, Calif.; Mint® Online, available from Intuit, Inc. of Mountain View, Calif.; and/or various other systems discussed herein, and/or known to those of skill in the art at the time of filing, and/or as developed after the time of filing. In one embodiment, data collected from users of Mint® is not used with other service provider systems, such as QuickBooks®.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system", "computing entity", and/or "computing environment" can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given system as that system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the system in the production environment such as a data center, a cloud computing environment, a dedicated hosting environment, and/or one or more other computing environments in which one or more assets used by the application in the production environment are implemented; one or more computing systems or computing entities used to implement at least part of the system in the production environment; one or more virtual assets used to implement at least part of the system in the production environment; one or more supervisory or control systems, such as hypervisors, or other monitoring and management systems used to monitor and control assets and/or components of the production environment; one or more communications channels for sending and receiving data used to implement at least part of the system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the system in the production environment; one or more databases used to store data in the production environment; one or more internal or external services used to implement at least part of the system in the production environment; one or more backend systems, such as backend servers or other hardware used to process data and implement at least part of the system in the production environment; one or more modules/functions used to implement at least part of the system in the production environment; and/or any other assets/components making up an actual production environment in which at least part of the system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the system.

In various embodiments, one or more cloud computing environments are used to create, and/or deploy, and/or operate at least part of the system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features and elements provided or displayed to the user such as, but not limited to the following: data entry fields, question quality indicators, images, backgrounds, avatars, highlighting mechanisms, icons, buttons, controls, menus and any other features that individually, or in combination, create a user experience, as discussed herein, and/or as known in the art at the time of filing, and/or as developed after the time of filing.

As used herein, the terms "user experience page" and "user experience screen" are interchangeable in meaning and represent a changeable rendering or view of content that is provided to a user in the user experience display, according to one embodiment.

As used herein, the term "user experience" includes not only a search query creation process, an incremental search results receipt process, a user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "predictive model" is used interchangeably with "analytics model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the term "incremental search results" includes search results that are generated for search query terms based on the various information one or more (business and/or personal) financial management systems have for a user, as a user enters (e.g., in real-time) search query terms as part of a search query to a customer self-service system that supports the one or more financial management systems, according to one embodiment. The incremental search results are specific to the domain of financial management systems and may include automated suggestions for additional search query terms that are specific to searching the one or more financial management systems, according to one embodiment. Because the incremental search results are specific to the domain of the one or more financial management systems, as used herein, "incremental search results" is used interchangeably with "domain-specific incremental search results". The incremental search results are search results for a partial, potential, and/or complete search query that is based on the received search query terms and based on user data (e.g., user profile data), according to one embodiment. The incremental search results are search results for one or more potential search queries that a user could formulate from the search query terms that have been received by the customer self-service system, according to one embodiment.

As used herein, the term "incremental search content" includes one or more (usually multiple) incremental search results combined with suggested potential search queries, according to one embodiment. Although not technically correct, for simplicity, "incremental search results" may be used to reference "potential search queries" (e.g., suggested or possible search queries) that are based on the received search query terms, according to one embodiment.

As used herein the term "search text box" denotes a text box in which a user enters search query terms, according to one embodiment.

As used herein the term "results text box" denotes a text box in which the incremental search results are displayed, according to one embodiment. The results text box may be displayed in the form of a drop-down menu that appears below (or otherwise proximate to) a search text box, according to one embodiment.

User Experience

Figure 1B:
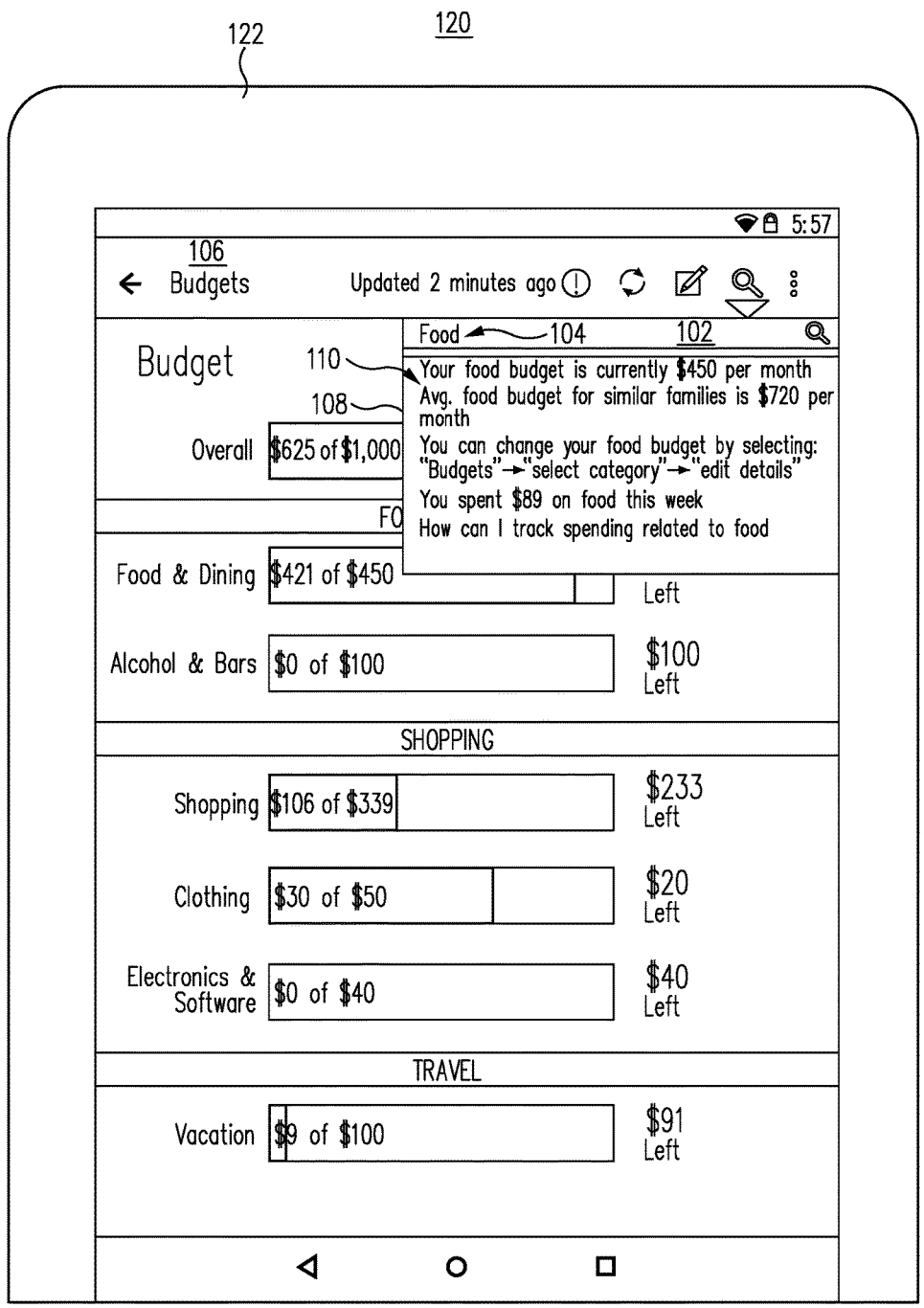

FIGS. 1A and 1B are examples of user experience pages that can be used by a customer self-service system to provide financial management system-based incremental search results to a user, to reduce the time and difficultly associated with receiving an answer to a question that may arise through the use of a financial management system, according to one embodiment. FIG. 1A illustrates a user experience display 100, which includes a search text box 102 that is used to receive search query terms 104 from a user, according to one embodiment. The search text box 102 can be provided by a standalone customer self-service system (e.g., QuickBooks® Online Support and/or Mint® Help of Intuit, Inc. of Mountain View, Calif.), which is configured to support one or more financial management systems, according to one embodiment. In another embodiment, the search text box 102 is integrated into part of a user experience page 106 of a financial management system (e.g., QuickBooks® and/or Mint® of Intuit, Inc. of Mountain View, Calif.), according to one embodiment.

The user experience display 100 includes a results text box 108 that is a user experience element in which the customer self-service system displays incremental search content 110, according to one embodiment. The results text box 108 is a drop-down menu that is located near, proximate, and/or adjacent to the search text box 102, according to one embodiment. The search text box 102 is located in an upper region of the user experience display 100, and the results text box 108 is located adjacent to and below the search text box 102, according to one embodiment. The search text box 102 is located in a lower region of the user experience display 100, and the results text box 108 is located above the search text box 102, according to one embodiment. The results text box 108 is rendered on top of other content that is provided in the user experience page 106, according to one embodiment. The results text box 108 is overlaid on top of other content that is provided in the user experience page 106, in such a manner that it is apparent that there is additional content at a location on the user experience page 106 that appears to be beneath the results text box 108, according to one embodiment.

The customer self-service system populates the results text box 108 with incremental search content 110 that is specific to one or more financial management systems, according to one embodiment. The incremental search content 110 includes a plurality of incremental search results, with each of the incremental searches results being displayed on a different line within the results text box 108, according to one embodiment. The incremental search content 110 includes, but is not limited to, definitions of the search query terms 104 that are related to personal and/or business financial management systems, definitions and explanations of acronyms of the search query terms 104 that are related to personal and/or business financial management systems, transaction data and/or user profile data that are associated with a user's use of personal and/or business financial management systems, financial management system forms (e.g., receipts, invoices, pay stubs, etc.) that are associated with the search query terms 104, explanations of how the search query terms are or can be used by the personal and/or business financial management systems, suggestions for potential search queries that are related to financial management systems and can be formulated from the search query terms 104, and/or answers to potential search queries that may be formulated from the search query terms 104 (even if the user has not entered complete versions of potential search queries), according to one embodiment. To provide answers to potential search queries, the customer self-service system determines the potential search queries that can be formulated from the search query terms 104, does not necessarily display the potential search queries, but provides/displays the answers to the potential search queries as incremental search results of the incremental search content 110, according to one embodiment. The number of incremental search results included in the incremental search content 110 is limited to 5, 10, 20, or some other predetermined or dynamically determined number, to facilitate digestion of the incremental search content 110 by users, according to one embodiment.

The incremental search content 110 includes character limited incremental search results, according to one embodiment. For example, each of the incremental search results are limited to, for example, 50 characters, according to one embodiment. Other predetermined or dynamically determined character limits can be used, but the customer self-service system applies a character limit to the incremental search results of the incremental search content 110 in order to reduce the effort used by a user in finding, reading, interpreting, and/or understanding the incremental search content 110, according to one embodiment.

The incremental search content 110 includes incremental search results that have topics that are the same as (or similar to) the search query terms 104 received from the user with the search text box 102, according to one embodiment. For example, if the search query terms 104 are related to the topic "invoice", then the incremental search content 110 will include incremental search results that also have the topic of invoice, according to one embodiment. Although the customer self-service system can use a topic-based search algorithm, the customer self-service system can also use other search algorithms to identify content that is stored by the customer self-service system that is responsive to a partial, potential, and such or complete search query provided by the user, according to one embodiment.

The incremental search content 110 includes incremental search results that are answers to potential search queries that the user may be formulating using search query terms 104, according to one embodiment. In other words, the customer self-service system uses the received search query terms 104 to predict potential search queries that the user is likely to formulate with the search query terms 104, and provides incremental search content 110 that are answers to the potential search queries, according to one embodiment. Using the example illustrated in the user experience display 100 of FIG. 1A, the customer self-service system populates the incremental search content 110 in response to determining that the search query terms 104 (e.g., invoice) are likely to be used by the user to formulate one or more questions such as "when did I send an invoice to Diego Rodriguez?"; "I want to send an invoice to Kelly's bakery?"; "How do I create an invoice?"; and "What are invoices?", according to one embodiment. The customer self-service system can also populate the incremental search content 110 with suggested potential search queries (in response to receipt of the search query terms 104), such as "How to send an invoice to someone." In other words, the customer self-service system uses the search query terms 104 to determine which search queries the user is likely to formulate, and to provide those search queries and/or to provide answers to those search queries in the results text box 108, according to one embodiment. As discussed in more detail below, the potential search queries are determined by the customer self-service system at least partially based on the transactional data that is stored by the financial management system for the user and/or at least partially based on user profile data that is generated based on user interactions with the financial management system and/or with the customer self-service system, according to one embodiment.

FIG. 1B illustrates a user experience display 120, which illustrates an example of displaying incremental search results in a mobile environment for a customer self-service system that supports a financial management system (e.g., it personal financial management system, such as Mint® of Intuit, Inc. of Mountain View, Calif.), according to one embodiment. In addition to the many other advantages described herein, the disclosed embodiments of providing domain-specific incremental search results improves the usability/functionality of searching for content on a mobile device. Mobile computing devices (e.g., smart phones, tablets, etc.) typically allow users to enter text for search queries using keyboards, styluses, and other text input devices. However, entering text in a mobile device is typically slower and more tedious and using a traditional keyboard. As result, providing domain-specific incremental search results based on partial search queries and/or potential search queries, which are extrapolated from limited quantities of search query text, enable users to interact with and search mobile computing devices with the efficiency and thoroughness that is difficult to achieve without the assistance of a full-size keyboard and mouse. Accordingly, the disclosed embodiments of providing domain specific incremental search results improves the fields of mobile computing device operations, mobile computing device user experience design, and mobile computing device content searching, according to one embodiment.

The user experience display 120 is displayed on a mobile computing device 122, according to one embodiment. The user experience display 120 also includes the search text box 102 that is used to receive search query terms 104 from a user, and the results text box 108 that is used to display incremental search content 110 in response to the search query terms 104, according to one embodiment. The user experience page 106 includes an example content for a personal financial management system (e.g., Mint® of Intuit, Inc. of Mountain View, Calif.) that supports users in maintaining, tracking, and improving personal finances, according to one embodiment.

For both the user experience display 100 and the user experience display 120, several advantages can be achieved by displaying the incremental search content 110 in the results text box 108, in response to the search query terms 104 received by a customer self-service system. As examples of advantages, the user can receive answers to the user's questions before he finishes formulating the question, the user can receive assistance in formulating the user's questions and therefore save the time of formulating the question that he had, the user can quickly find the answer to the user's question without searching through one or more pages of text, the user can quickly read and understand the answer to the user's question, the user can quickly find the question to the user's answer, and the user can receive answers to the user's questions that include the user's transaction data and/or personal information, according to one embodiment. The user can more efficiently and thoroughly search through financial management systems from mobile computing devices, according to one embodiment. These several advantage are examples of how the disclosed embodiments resolve/address the deficiencies of traditional techniques for providing search results.

Architecture

Figure 2A:
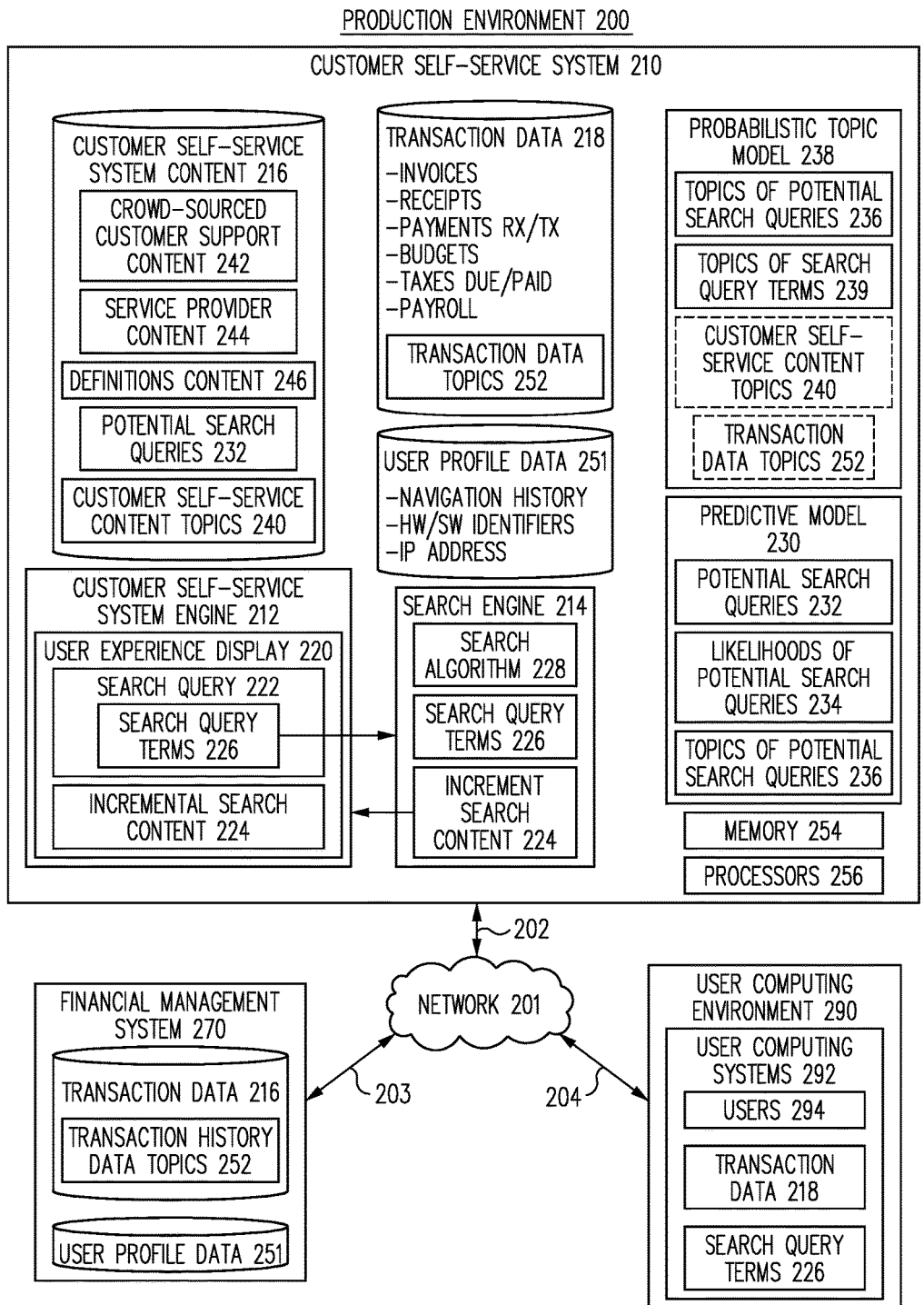
FIGS. 2A and 2B are block diagrams of an architecture for providing domain-specific incremental search results with a customer self-service system for a financial management system, in accordance with one embodiment.
Figure 2B:
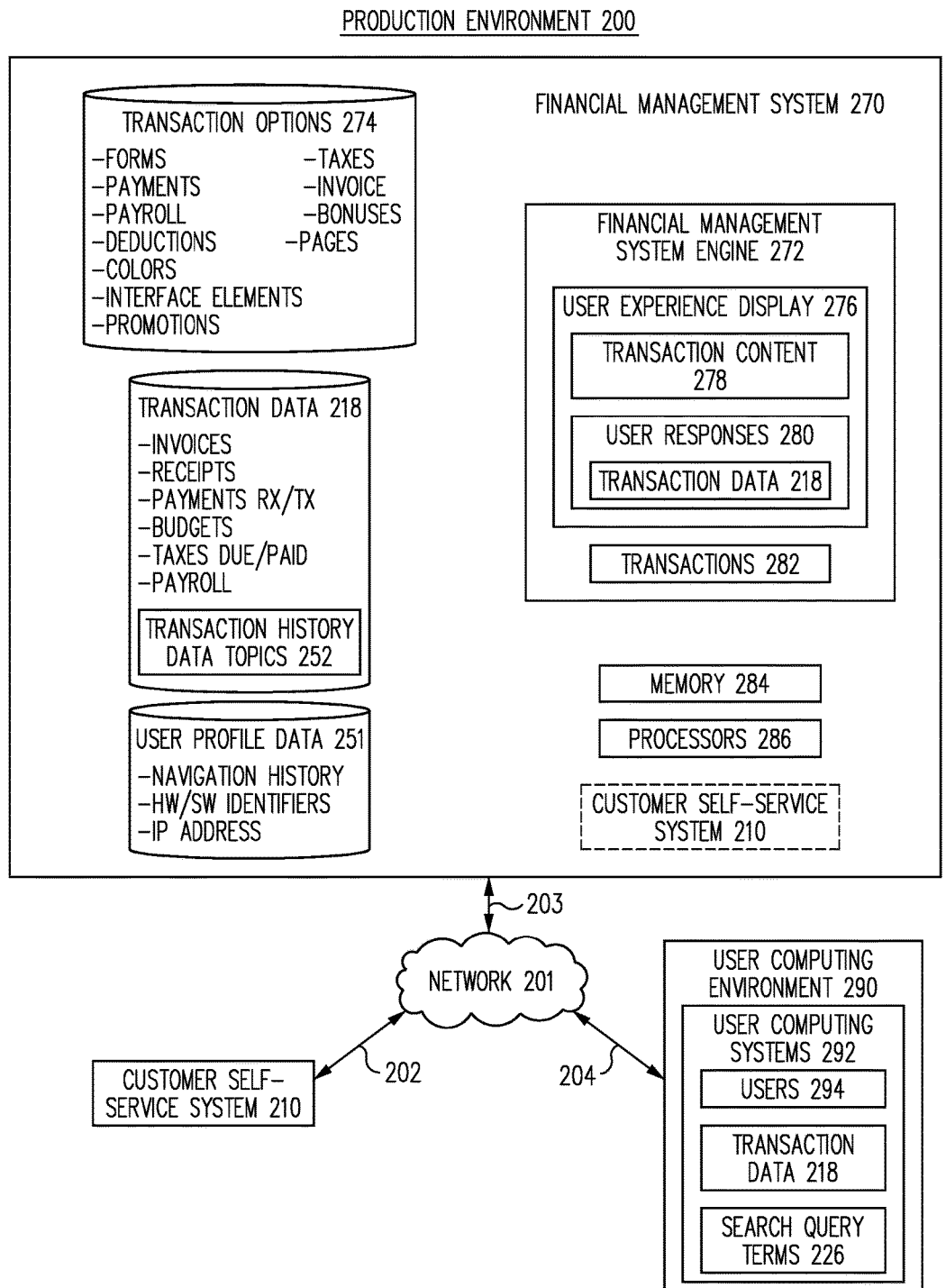

FIGS. 2A and 2B illustrates an example block diagram of a production environment 200 for providing domain-specific incremental search results with a customer self-service system for a financial management system, according to one embodiment. According to various embodiments, the financial management can be a business financial management system, a personal financial management system, a business accounting system, and/or combination of one or more particular types of financial management systems. The production environment 200 includes a customer self-service system 210, a financial management system 270, and a user computing environment 290 that are communicatively coupled through a network 201, according to one embodiment. The customer self-service system 210 is hosted in a computing environment, according to one embodiment. The financial management system 270 is hosted in a computing environment, according to one embodiment. The customer self-service system 210, the financial management system 270, and the user computing environment 290 are communicatively coupled to each other through the network 201 through one or more communications channels 202, 203, and 204, according to one embodiment.

The customer self-service system 210 includes a customer self-service system engine 212, a search engine 214, customer self-service system content 216, and transaction data 218 for providing domain-specific incremental search results for search query terms with the customer self-service system 210 for the financial management system 270, according to one embodiment. The customer self-service system engine 212 receives search query terms from users of the customer self-service system 210, and provides incremental search content to the users in response to receipt of the search query terms, according to one embodiment. The customer self-service system 210 uses the search engine 214 to search for the incremental search content based on the search query terms, according to one embodiment. The search engine 214 identifies the incremental search content at least partially based on the search query terms, at least partially based on the transactional data 218, and/or at least partially based on user profile data 251, according to one embodiment. The search engine 214 populates the incremental search content from the customer self-service system content 216 and/or from the transaction data 218, based on the search query terms, according to one embodiment.

The customer self-service system engine 212 and/or the customer self-service system 210 provide the user experience display 220 for receiving a search query 222 from a user and for providing incremental search content 224 to the user, according to one embodiment. The user experience display 220 includes, but is not limited to, text boxes, menus, buttons, avatars, audio/video content, and/or other user experience elements to receive the search query 222 and to provide the incremental search content 224, according to one embodiment. The user experience display 220 includes a search text box in which the user formulates the search query 222 with one or more search query terms 226, according to one embodiment. The user experience display 220 includes a results text box in which the incremental search content 224 (e.g., a plurality of incremental search results) is displayed, according to one embodiment. The results text box is positioned proximate (e.g., adjacent) to the search text box in the user experience display 220 to enable the user to conveniently find, read, understand, and select the incremental search content 224, if the user seeks further information about the incremental search content 224, according to one embodiment.

The search engine 214 and/or the customer self-service system 210 includes a search algorithm 228 that is used to define the incremental search content 224, according to one embodiment. The search engine 214 receives the search query terms 226 from the customer self-service system engine 212 and applies the search query terms 226 to the search algorithm 228 to generate/define the incremental search content 224, according to one embodiment. The search engine 214 uses the search algorithm 228 to search the customer self-service system content 216 to identify which portions of the customer self-service system content 216 to include in the incremental search content 224, for display/presentation to the users, according to one embodiment. In one embodiment, the search algorithm 228 includes probabilistic topics model, query clustering, query de-duplication, Latent Dirichlet allocation algorithm, or one or more other database or content searching algorithms for matching the search query terms 226 with portions of the customer self-service system content 216, according to one embodiment. In one embodiment, the search algorithm 228 determines potential and/or likely options for the search query 222 based on one or more of the search query terms 226 and includes the potential and/or likely options of the search query 222 in the incremental search content 224, to reduce the time the user spends formulating the search query 222, according to one embodiment. The potential and/or likely options of the search query 222 are potential search queries 232, which may be stored in the customer self-service system content 216, according to one embodiment. The search algorithm 228 identifies answers to the potential search queries 232 and provides those answers in the incremental search content 224, according to one embodiment. The search algorithm 228 identifies customer self-service system content 216 that includes the same topic as one or more received search query terms 226 and provides (to the user) the customer self-service system content 216 that has the same topic as the search query terms 226, according to one embodiment. In one embodiment, the search engine 214 and/or the search algorithm uses the user profile data 251 in combination with the transaction data 218 to define the potential search queries 232, to define the incremental search content 224, and/or to select which customer self-service system content 216 to provide to a user in response to the search query terms 226. The user profile data 251 includes, but is not limited to the user's navigation or browser history within the financial management system 270, clickstream data for the user, estimated income level of the user, estimated education level of the user, user-experience with the financial management system 270 (e.g., a repeat versus first-time user), Internet Protocol ("IP") address characteristics (e.g., library, corporation, residential, foreign IP address, etc.), hardware and/or software identifiers for the user (e.g., operating system, brand of computing system, etc.), and the like, according to one embodiment.

The search algorithm 228 includes a predictive model 230 for determining potential search queries 232 that may be formulated by the user from the received search query terms 226 and/or the transaction data 218 and/or the user profile data 251, according to one embodiment. The predictive model 230 is trained to identify potential search queries 232 from the search query terms 226, according to one embodiment. The potential search queries 232 are part of the customer self-service system content 216, according to one embodiment. The predictive model 230 generates likelihoods of potential search queries 234, from which the customer self-service system 210 and/or the search engine 214 can distinguish more-likely from less-likely ones of the potential search queries 232, according to one embodiment. The predictive model 230 identifies the topics of the potential search queries 236 after identifying the potential search queries 232 and after identifying the more relevant ones of the potential search queries 232 (e.g., based on the likelihoods of potential search queries 234), according to one embodiment. The predictive model 230 uses the transaction data 218 and/or the user profile data 251 in determining the potential search queries 232 and/or the likelihoods of potential search queries 234, according to one embodiment. As an example, if the user has a history of reviewing one or more sent invoices at the beginning of the month, then receiving the term "invoice" as one of the search query terms 226 with increase a likelihood that the potential search queries 232 will be related to reviewing one or more sent invoices, at least partially based on the user profile data 251 (e.g., user's navigation history) and at least partially based on the transaction data 218 (e.g., reports requested, created, or reviewed), according to one embodiment.

The predictive model 230 is trained from existing searches performed by the search engine 214 and from prior search queries submitted by users to the customer self-service system 210, according to one embodiment. The predictive model 230 is trained using the transaction data 218, the user profile data 251, and/or using prior search queries submitted by users to the customer self-service system 210, according to one embodiment. The predictive model 230 is trained using one or more predictive model training operation including, but not limited to, regression, logistic regression, decision trees, artificial neural networks, support vector machines, linear regression, nearest neighbor methods, distance based methods, naive Bayes, linear discriminant analysis, and k-nearest neighbor algorithm, according to one embodiment.

The predictive model 230 uses a probabilistic topic model 238 to identify the topics of potential search queries 236, according to one embodiment. The probabilistic topic model 238 receives the potential search queries 232 and/or the search query terms 226 and returns the topics of potential search queries 236 and/or generates topics of search query terms 239, according to one embodiment. The probabilistic topic model 238 utilizes the Latent Dirichlet allocation algorithm to identify the topics of potential search queries 236 and/or the topics of search query terms 239, to enable the predictive model 230 and/or the search engine 214 to match relevant customer self-service system content 216 and/or transaction data 218 (e.g., an invoice amount or date) with the search query terms 226, according to one embodiment. In one embodiment, the customer self-service system 210 uses the probabilistic topic model 238 to generate/identify customer self-service content topics 240 from the customer self-service system content 216 and/or to generate/identify transaction data topics 252 from the transaction data 218, according to one embodiment. In one embodiment, the predictive model 230 employs techniques such as, but not limited to, probabilistic topics models, query clustering, query de-duplication, Latent Dirichlet allocation algorithm, or one or more other database or content searching algorithms to match customer self-service system content 216 and/or transaction data 218 (e.g., an invoice amount or date) with the search query terms 226.

Examples of customer self-service content topics 240 and/or transaction data topics 252 include, but are not limited to, invoices, receipts, payments, budgets, budget categories, budget thresholds, taxes, quarterly taxes, payroll, employee benefits, travel expenses, mileage deductions, asset tracking, asset valuation, accounts receivable, accounts payable, capital, debts, inventory, customers, vendors, and the like, according to one embodiment. Each of the topics includes one or more sub-topics such as, how to create invoices, how to send invoices, how to aggregate invoices, creating the invoice reports, creating a budget category, adjusting budget thresholds, estimating quarterly taxes, compiling quarterly tax earnings, setting up payroll information, estimating available capital, estimating available inventory, estimating changes in inventory, contacting customers, contacting vendors, how to add new customers and/or vendors, how to track travel expenses, how to enter travel expenses, the amount spent in travel expenses over a given period of time, and the like, according to one embodiment.

The search engine 214 uses the topics of potential search queries 236 and/or the topics of search query terms 239 to match relevant content from the customer self-service system content 216 with the search query terms 226, according to one embodiment. The search engine 214 matches relevant content with search query terms 226 by determining which of the topics of potential search queries 236 are relevant to (e.g., most relevant to) the highest likelihoods of potential search queries 234, and by retrieving portions of the customer self-service system content 216 having customer self-service content topics 240 that match, are similar to, and/or are relevant to those topics of potential search queries 236, according to one embodiment.

The customer self-service system 210 assigns topics to the content of the customer self-service system content 216 to facilitate matching portions of the customer self-service system content 216 with the search query terms 226 (or with the topics of search query terms 239), according to one embodiment. The customer self-service system 210 applies the content of the customer self-service system content 216 to the probabilistic topic model 238 to define the customer self-service content topics 240, according to one embodiment. The customer self-service content topics 240 are associated, in a database or other data store, with the content of the customer self-service system content 216, according to one embodiment.

The customer self-service system content 216 includes a variety of content that can be provided to the user to answer users' questions, according to one embodiment. The customer self-service system content 216 includes crowd-sourced customer support content 242, service provider content 244, definitions content 246, potential search queries 232, and customer self-service content topics 240, according to one embodiment. The crowd-sourced customer support content 242 includes questions and responses that are submitted by a community of question askers and response providers that use the customer self-service system 210 or another question and answer customer support system that is associated with the financial management system 270, according to one embodiment. The crowd-sourced customer support content 242 can also be referred to as user generated content ("UGC") to distinguish the crowd-sourced customer support content 242 from the service provider content 244, according to one embodiment. The service provider content 244 includes white papers, questions, answers, frequently asked questions, answers to frequently asked questions, tutorials, audio/video content, interactive content, or other content that can be used to assist users in learning about accounting, running a business, business operations, bookkeeping, the financial management system 270, or other relevant subject matter, according to one embodiment. The definitions content 246 include acronym definitions, definitions of accounting terms (e.g., accountant jargon), and/or definitions of terms that are related to tax law, accounting principles, business management, and the financial management system 270, according to one embodiment.

The customer self-service system 210 determines which portions of the customer self-service system content 216 to provide to the user (e.g., in real-time) dynamically as the user enters search query terms 226, according to one embodiment. The customer self-service system 210 determines the potential search queries 232 and provides incremental search content 224 that is based on the search query terms 226, according to one embodiment. Because the potential search queries 232 change based on additions, deletions, or other modifications to the search query terms 226, the customer self-service system 210 dynamically updates the incremental search content 224 that is displayed, as the user adds, deletes, and/or modifies the search query terms 226 within the user experience display 220, according to one embodiment.

The customer self-service system 210 combines customer self-service system content 216 with the transaction data 218 to generate the incremental search content 224, according to one embodiment. For example, if the customer self-service system 210 determines that the search query terms 226 and/or the potential search queries 232 associated with the search query terms 226 are relevant to a user's transaction data, the customer self-service system 210 will include at least some of the transaction data 218 in the incremental search content 224, according to one embodiment. As another example, if the search query terms 226 include "receivable", the customer self-service system 210 may determine that one of the potential search queries 232 is, "What is the value of my account receivable assets?", according to one embodiment. In response to the customer self-service system 210 determining that one of the potential search queries 232 is, "What is the value of my account receivable assets?", the customer self-service system 210 can include the user's current and/or prior calculated account receivables (e.g., $73,512.00) as one of the incremental search results in the incremental search content 224, according to one embodiment.

The customer self-service system 210 uses the transaction data 218 to generate the incremental search content 224, according to one embodiment. The transaction data 218 includes historical and recently received invoices, receipts, reports, payments received, payments transmitted, budgets, budget categories, budget category thresholds, tax information, payroll information, employee information, debt, credit, asset quantity, asset value, and any other information that is currently used, that can be used, or that may be used in the future to provide personal and/or business financial management services, according to one embodiment. The customer self-service system 210 receives the transaction data 218 and/or the user profile data 251 from the financial management system 270, according to one embodiment. The customer self-service system 210 is optionally integrated into the financial management system 270 and uses data retrieval commands or calls to retrieve at least part of the transaction data 218 for use in the incremental search content 224, according to one embodiment.

The customer self-service system 210, the customer self-service system engine 212, and/or the search engine 214 generate the transaction data topics 252 to support matching or pairing portions of the transaction data 218 with the search query terms 226, according to one embodiment. The customer self-service system 210, the customer self-service system engine 212, and/or the search engine 214 use the probabilistic topic model 238 to generate the transaction data topics 252, according to one embodiment. The probabilistic topic model 238 generates the transaction data topics 252 by analyzing the transaction data 218, according to one embodiment. The transaction data topics 252 are associated with the transaction data to (e.g., in a database, table, or other data structure), to enable the customer self-service system 210 to retrieve relevant portions of the transaction data 218 based on topic, according to one embodiment. Although topic-based searches and/or retrieval of the transaction data 218 may be used to retrieve transaction data 218 that is associated with the search query terms 226, other data search techniques may be used to identify portions of the transaction data 218 that is associated with the received search query terms 226, according to one embodiment.

The customer self-service system 210 is partially or wholly stored in memory 254 (inclusive of non-volatile memory and volatile memory) and is partially or wholly executed by processors 256, according to one embodiment.

The user computing environment 290 is representative of one or more user computing systems 292 that may be used by one or more users 294 to provide the transaction data 218 to the financial management system 270, according to one embodiment. The user computing environment 290 may be used to provide search query terms 226 to the customer self-service system 210 (directly or indirectly through the financial management system 270), and may be used to receive incremental search content 224 from the customer self-service system 210 (directly or indirectly through the financial management system 270), according to one embodiment.

FIG. 2B illustrates additional features of the financial management system 270 within the production environment 200, according to one embodiment. The financial management system 270 includes a financial management system engine 272, transaction options 274, and the transaction data 218 to support operations of one or more personal and/or business financial management systems, according to one embodiment.

The financial management system engine 272 provides the user experience display 276, by which the financial management system engine 272 receives the transaction data 218 by providing users with transaction content 278 to solicit user responses 280, according to one embodiment. The financial management system engine 272 populates the transaction content 278 with one or more of a variety of transaction options 274, including, but not limited to, forms, payment reports, payroll functions, invoice options, colors, user interface elements, promotions, bank account login features, and the like, according to one embodiment. The user experience display 276 incorporates portions of the user experience display 220 (of the customer self-service system 210) to enable the customer self-service system 210 to acquire information from users of the financial management system 270, according to one embodiment.

The financial management system engine 272 and/or the financial management system 270 use the user responses 280 (e.g., the transaction data 218) to prepare transactions 282, according to one embodiment. The transactions 282 (e.g., sending an invoice to a customer) are added/stored as the transaction data 218, according to one embodiment.

The financial management system 270 is partially or wholly stored in memory 284 (inclusive of non-volatile memory and volatile memory) and is partially or wholly executed by processors 286, according to one embodiment.

The customer self-service system 210 is optionally integrated within the financial management system 270 to facilitate the retrieval and sharing of the transaction data 218 and/or the user profile data 251, according to one embodiment. The customer self-service system 210 shares some computing environment resources (e.g., memory, processors, computer cabinets, networking equipment, etc.) with the financial management system 270 but is a system that can be implemented on computing environment resources that are independent of the financial management system 270, according to one embodiment. In one embodiment, portions of the customer self-service system 210 are integrated into the financial management system 270, while the remainder of the customer self-service system 210 operates independent of the financial management system 270. In one embodiment, the financial management system 270 hosts the user experience display 220 (of the customer self-service system 210) while the functionality of the customer self-service system 210 that determines the incremental search content 224 operates on computing environment resources that are independent of the computing environment resources of the financial management system 270, according to one embodiment.

Process

Figure 3:
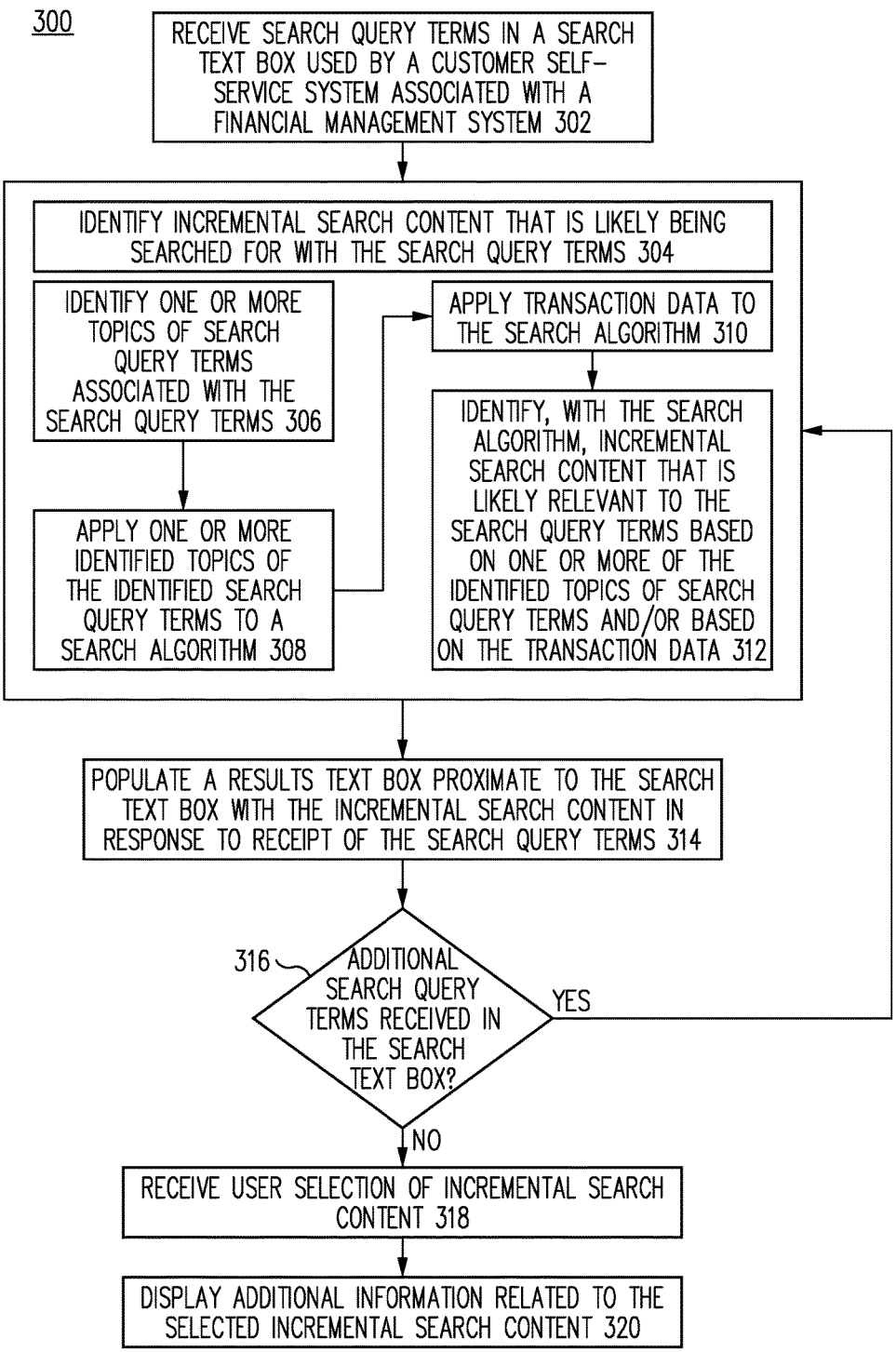
FIG. 3 is a flow diagram of a process for providing domain-specific incremental search results with a customer self-service system for a financial management system, in accordance with one embodiment.

FIG. 3 is an example flow diagram of a process 300 for providing domain-specific incremental search results for search query terms with a customer self-service system for a financial management system, according to one embodiment. The process 300 includes operations that may be used by the production environment 200 to generate user experiences/user experience pages similar to the ones illustrated in FIGS. 1A and 1B, according to one embodiment.

At operation 302, the process receives search query terms in a search text box used by a customer self-service system associated with a financial management system, according to one embodiment. Operation 302 proceeds to operation 304, according to one embodiment.

At operation 304, the process identifies incremental search content that is likely being searched for with the search query terms, according to one embodiment. Operation 304 includes sub-operations 306, 308, 310, and/or 312, according to one embodiment.

At operation 306, the process identifies one or more topics of search query terms associated with the search query terms, according to one embodiment. Operation 306 proceeds to operation 308, according to one embodiment.

At operation 308, the process applies one or more of the identified topics of search query terms to a search algorithm, according to one embodiment. Operation 308 proceeds to operation 310, according to one embodiment.

At operation 310, the process applies transaction data to the search algorithm, according to one embodiment. Operation 310 proceeds to operation 312, according to one embodiment.

At operation 312, the process identifies, with the search algorithm, incremental search content that is likely relevant to the search query terms based on one or more of the identified topics of search query terms and/or based on the transaction data, according to one embodiment. Operation 312 and/or operation 304 proceeds to operation 314, according to one embodiment.

At operation 314, the process populates a results text box proximate to the search text box with the incremental search content in response to receipt of the search query terms, according to one embodiment. Operation 314 proceeds to operation 316, according to one embodiment.

At operation 316, the process determines if additional search query terms are received in the search text box, according to one embodiment. If additional search query terms were received in the search text box, operation 316 returns to operation 304, according to one embodiment. If additional search query terms are not received in the search text box, operation 316 proceeds to operation 318, according to one embodiment.

At operation 318, the process receives a user selection of the incremental search content, according to one embodiment. For example, the user clicks on one of the incremental search results provided in the results text box, according to one embodiment. Operation 318 proceeds to operation 320, according to one embodiment.

At operation 320, the process displays additional information related to the selected incremental search content, according to one embodiment. The customer self-service system provides tutorials, audio/video content, additional search results, relevant and similar questions with corresponding answers in one or more traditional search results pages (e.g., webpages), according to one embodiment.

Figure 4A:
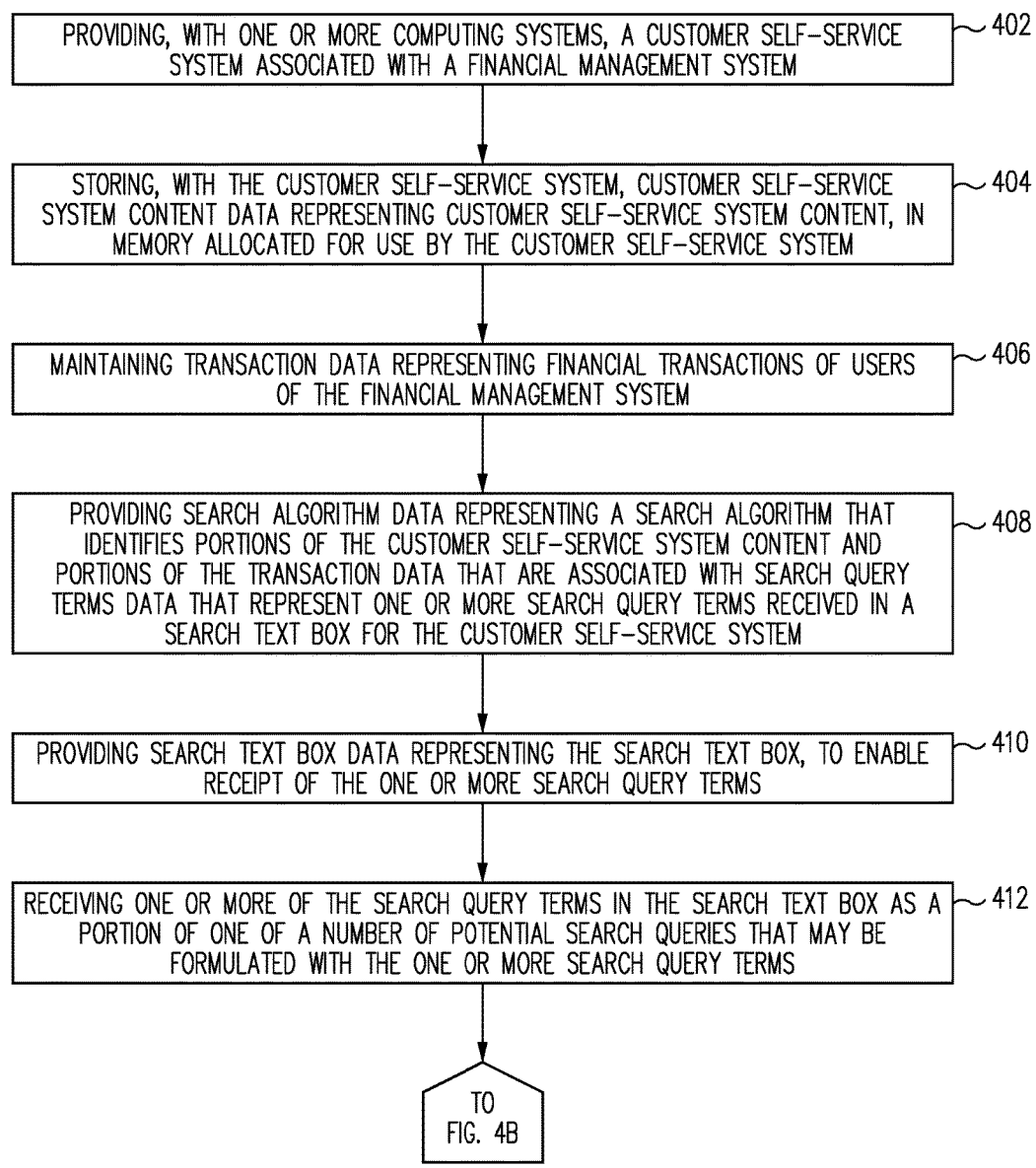
FIGS. 4A and 4B are a flow diagram of a process for providing domain-specific incremental search results with a customer self-service system for a financial management system, in accordance with one embodiment.
Figure 4B:
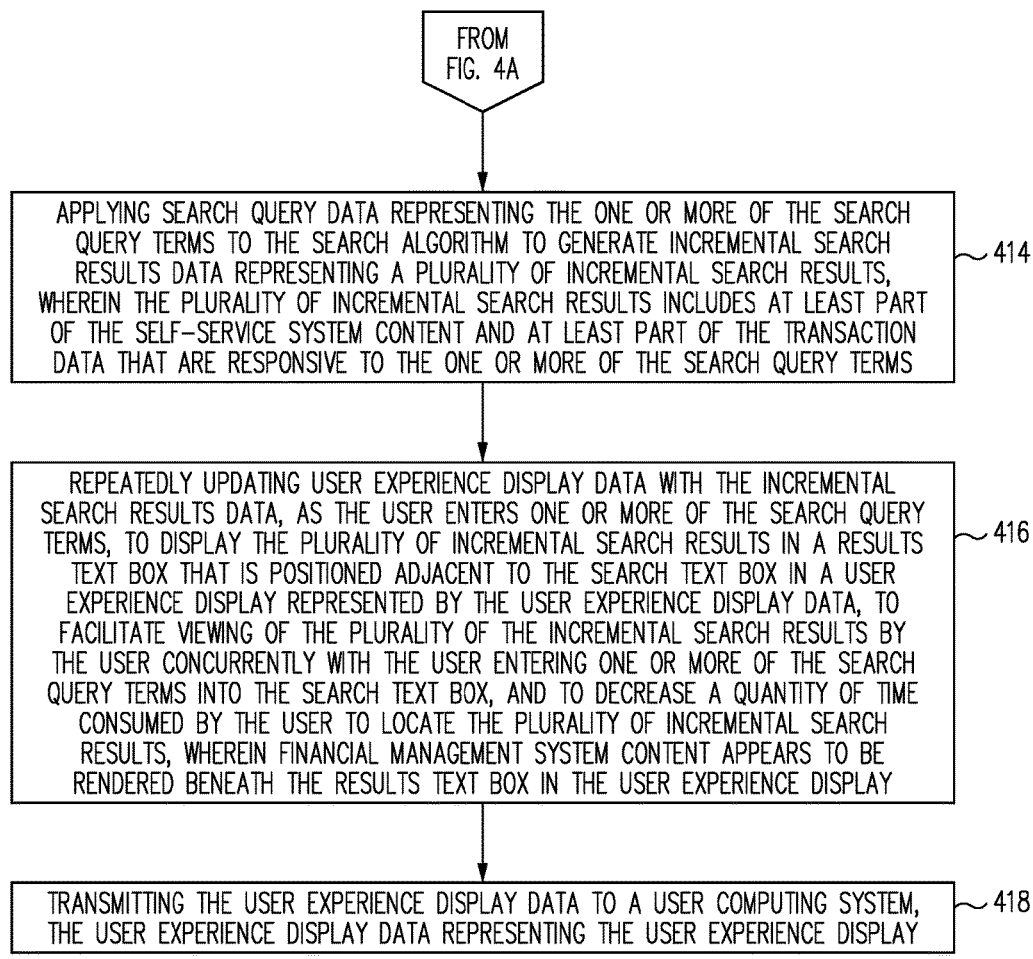

FIG. 4 is an example flow diagram of a process 400 for providing domain-specific incremental search results for search query terms with a customer self-service system for a financial management system, according to one embodiment.

At operation 402, the process includes providing, with one or more computing systems, a customer self-service system associated with a financial management system, according to one embodiment. Operation 402 proceeds to operation 404, according to one embodiment.

At operation 404, the process includes storing, with the customer self-service system, customer self-service system content data representing customer self-service system content, in memory allocated for use by the customer self-service system, according to one embodiment. Operation 404 proceeds to operation 406, according to one embodiment.

At operation 406, the process includes maintaining transaction data representing financial transactions of users of the financial management system, according to one embodiment. Operation 406 proceeds to operation 408, according to one embodiment.

At operation 408, the process includes providing search algorithm data representing a search algorithm that identifies portions of the customer self-service system content and portions of the transaction data that are associated with search query terms data that represent one or more search query terms received in a search text box for the customer self-service system, according to one embodiment. In one embodiment, the customer self-service system content that is relevant to the search query terms includes portions of the customer self-service system content that has the same or similar topics as the search query terms. In one embodiment, the customer self-service system content that is relevant to the search query terms includes portions of the customer self-service content that is matched to the search query terms with a search algorithm, probabilistic topic model, and/or predictive model. Operation 408 proceeds to operation 410, according to one embodiment.

At operation 410, the process includes providing search text box data representing the search text box, to enable receipt of the one or more search query terms, according to one embodiment. Operation 410 proceeds to operation 412, according to one embodiment.

At operation 412, the process includes receiving one or more of the search query terms in the search text box as a portion of one of a number of potential search queries that may be formulated with the one or more search query terms, according to one embodiment. Operation 412 proceeds to operation 414, according to one embodiment.

At operation 414, the process includes applying search query data representing the one or more of the search query terms to the search algorithm to generate incremental search results data representing a plurality of incremental search results, wherein the plurality of incremental search results includes at least part of the self-service system content and at least part of the transaction data that are responsive to the one or more of the search query terms, according to one embodiment. Operation 414 proceeds to operation 416, according to one embodiment.

At operation 416, the process includes repeatedly updating user experience display data with the incremental search results data, as the user enters one or more of the search query terms, to display the plurality of incremental search results in a results text box that is positioned adjacent to the search text box in a user experience display represented by the user experience display data, to facilitate viewing of the plurality of the incremental search results by the user concurrently with the user entering one or more of the search query terms into the search text box, and to decrease a quantity of time consumed by the user to locate the plurality of incremental search results, wherein financial management system content appears to be rendered beneath the results text box in the user experience display, according to one embodiment. Operation 416 proceeds to operation 418, according to one embodiment.

At operation 418, the process includes transmitting the user experience display data to a user computing system, the user experience display data representing the user experience display, according to one embodiment.

As noted above, the specific illustrative examples discussed above are but illustrative examples of implementations of embodiments of the method or process for providing domain-specific incremental search results for search query terms with a customer self-service system for a financial management system. Those of skill in the art will readily recognize that other implementations and embodiments are possible. Therefore, the discussion above should not be construed as a limitation on the claims provided below.

Providing domain-specific incremental search results for search query terms with a customer self-service system for a financial management system is not an abstract idea and allows for significant improvement to the fields of user experience, self-service systems, customer service, customer retention, business management, financial management, and domain-specific search engines, according to one embodiment. The present disclosure adds significantly to the concept of content searching by providing domain-specific incremental search results for search query terms with a customer self-service system for one or more financial management systems because the customer self-service system: reduces the amount of time users spend searching for an answer to a question; reduces the amount of time users spend locating an answer to a question in a user experience page; reduces the likelihood that a user will misunderstand an answer to a question; assists users in formulating a search query; and reduces the amount of time users spend entering a search query into a search text box, according to one embodiment. As a result, embodiments of the present disclosure allow for reduced use of processor cycles, memory, and power consumption, by reducing the time spent by users to search for answers among search results and by reducing time spent by users to repeatedly search for an answer to their question in computing environments, according to one embodiment. Consequently, computing and communication systems implementing and/or providing the embodiments of the present disclosure are transformed into more operationally efficient devices and systems.

In addition to improving overall computing performance, providing domain-specific incremental search results for search query terms with a customer self-service system for a financial management system significantly improves the field of financial management systems, by reducing the amount of time that a user is removed from the operations tasks of running the user's business due to delays caused by users' feelings of fear, uncertainty, and/or doubt, according to one embodiment. Furthermore, by providing domain-specific incremental search results for search query terms with a customer self-service system for a financial management system, the disclosed embodiments help maintain and/or build trust and therefore loyalty in the financial management system with which the customer self-service system is associated, which results in repeat customers, and reduced abandonment of use of the financial management system, according to one embodiment.

In accordance with an embodiment, a computing system implemented method provides domain-specific incremental search results for search query terms with a customer self-service system for a financial management system. The method includes providing, with one or more computing systems, a customer self-service system associated with a financial management system, according to one embodiment. The method includes storing, with the customer self-service system, customer self-service system content data representing customer self-service system content, in memory allocated for use by the customer self-service system, according to one embodiment. The method includes maintaining transaction data representing financial transactions of users of the financial management system, according to one embodiment. The method includes providing search algorithm data representing a search algorithm that identifies portions of the customer self-service system content and portions of the transaction data that are associated with search query terms data that represent one or more search query terms received in a search text box for the customer self-service system, according to one embodiment. The method includes providing search text box data representing the search text box, to enable receipt of the one or more search query terms, according to one embodiment. The method includes receiving one or more of the search query terms in the search text box as a portion of one of a number of potential search queries that may be formulated with the one or more search query terms, according to one embodiment. The method includes applying search query data representing the one or more of the search query terms to the search algorithm to generate incremental search results data representing a plurality of incremental search results, wherein the plurality of incremental search results includes at least part of the self-service system content and at least part of the transaction data that are responsive to the one or more of the search query terms, according to one embodiment. The method includes repeatedly updating user experience display data with the incremental search results data, as the user enters one or more of the search query terms, to display the plurality of incremental search results in a results text box that is positioned adjacent to the search text box in a user experience display represented by the user experience display data, to facilitate viewing of the plurality of the incremental search results by the user concurrently with the user entering one or more of the search query terms into the search text box, and to decrease a quantity of time consumed by the user to locate the plurality of incremental search results, wherein financial management system content appears to be rendered beneath the results text box in the user experience display, according to one embodiment. The method includes transmitting the user experience display data to a user computing system, the user experience display data representing the user experience display, according to one embodiment.

In accordance with an embodiment, a financial management system has a customer self-service system that provides incremental search results for search query terms. The system includes a user experience display that receives transaction data from users of a financial management system, wherein the user experience display provides the transaction data to the users of the financial management system, according to one embodiment. The system includes a transaction data store that stores transaction data, for the financial management system, in memory that is allocated for use by the financial management system, according to one embodiment. The system includes a customer self-service system content store that stores customer self-service system content data, representing customer self-service system content, in memory that is allocated for use by a customer self-service system that provides customer self-service searches for the financial management system, according to one embodiment. The system includes a search text box that receives search query term data representing search query terms from the users, wherein the search query terms constitute at least part of at least one potential search query, wherein the search text box is positioned within the user experience display and proximate to financial management system content provided to the users, the financial management system content being represented by financial management system content, according to one embodiment. The system includes a result texts box that displays incremental search content data representing incremental search content that the customer self-service system provides in response to the at least one potential search query wherein the results text box is a visually proximate to the search text box in the user experience display, according to one embodiment. The system includes a customer self-service system engine configured to apply the search query term data to a search engine to generate the incremental search content data, in response to receipt of the search query term data, the incremental search content data including at least part of the transaction data representing one or more transactions for the user in the financial management system and including at least part of the customer self-service system content data representing at least some of the customer self-service system content, according to one embodiment. The incremental search content includes one or more transactions for the user in the financial management system and at least some of the customer self-service system content, wherein the incremental search content is displayed in real-time to facilitate viewing of the incremental search content by the user as the user enters the each of the one or more search query terms into the search text box, wherein the results text box is overlaid on other at least part of the financial management system content in the user experience display, according to one embodiment.

In accordance with an embodiment, a system provides incremental search results for search query terms with a customer self-service system for a financial management system. The system includes one or more processors and memory having instructions which, if executed by the one or more processors, cause the one or more processors to perform a process for providing domain-specific incremental search results for search query terms with a customer self-service system for a financial management system, according to one embodiment. The process includes providing a customer self-service system associated with a financial management system, according to one embodiment. The process includes storing, with the customer self-service system, customer self-service system content data representing customer self-service system content, in memory allocated for use by the customer self-service system, according to one embodiment. The process includes maintaining transaction data representing financial transactions of users of the financial management system, according to one embodiment. The process includes providing search algorithm data representing a search algorithm that identifies portions of the customer self-service system content and portions of the transaction data that are associated with search query terms data that represent one or more search query terms received in a search text box for the customer self-service system, according to one embodiment. The process includes providing search text box data representing the search text box, to enable receipt of the one or more search query terms, according to one embodiment. The process includes receiving one or more of the search query terms in the search text box as a portion of one of a number of potential search queries that may be formulated with the one or more search query terms, according to one embodiment. The process includes applying search query data representing the one or more of the search query terms to the search algorithm to generate incremental search results data representing a plurality of incremental search results, wherein the plurality of incremental search results includes at least part of the self-service system content and at least part of the transaction data that are responsive to the one or more of the search query terms, according to one embodiment. The process includes repeatedly updating user experience display data with the incremental search results data, as the user enters one or more of the search query terms, to display the plurality of incremental search results in a results text box that is positioned adjacent to the search text box in a user experience display represented by the user experience display data, to facilitate viewing of the plurality of the incremental search results by the user concurrently with the user entering one or more of the search query terms into the search text box, and to decrease a quantity of time consumed by the user to locate the plurality of incremental search results, wherein financial management system content appears to be rendered beneath the results text box in the user experience display, according to one embodiment. The process includes transmitting the user experience display data to a user computing system, the user experience display data representing the user experience display, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method comprising:
providing, with one or more computing systems, a customer self-service system associated with a financial management system;
storing, with the customer self-service system, customer self-service system content data representing customer self-service system content, in memory allocated for use by the customer self-service system;
maintaining transaction data representing financial transactions of users of the financial management system;
providing search algorithm data representing a search algorithm configured to identify portions of the customer self-service system content and portions of the transaction data associated with search query terms data representing one or more search query terms received in a search text box for the customer self-service system;
providing search text box data representing the search text box, to enable receipt of the one or more search query terms;
receiving one or more of the search query terms in the search text box as a portion of one of a number of potential search queries that are formulated with the one or more search query terms;
applying, as each individual search query term is being entered into the search text box, search query data representing the one or more of the search query terms to the search algorithm to generate incremental search results data representing a plurality of incremental search results, wherein the plurality of incremental search results includes at least part of the self-service system content and at least part of the transaction data that are responsive to the one or more of the search query terms, the search query terms being further applied to a predictive model which predicts one or more potential search queries that are based on one or more of the search query terms, the one or more potential search queries being provided to the user through an updated user experience display responsive to additional potential search queries being predicted;
repeatedly personalizing user experience display data with updated and incremental search results data, as search query terms are being entered into the search text box, to display the plurality of incremental search results in a results text box that is positioned adjacent to the search text box in a user experience display represented by the user experience display data, wherein financial management system content appears to be rendered beneath the results text box in the user experience display; and
transmitting the user experience display data to a user computing system, the user experience display data representing the user experience display.

2. The method of claim 1, wherein the financial management system is a personal financial management system, a business financial management system, or a combination of both the personal financial management system and the business financial management system.

3. The method of claim 1, wherein the customer self-service system is part of the financial management system.

4. The method of claim 1, wherein the user computing system is a mobile computing device and repeatedly updating user experience display data with the incremental search results data facilitates searching the transaction data and the customer self-service system content from the mobile computing device.

5. The method of claim 1, further comprising:
determining one or more potential search queries formable from one or more of the search query terms; and
generating at least part of the incremental search results data based on the one or more potential search queries.

6. The method of claim 1, further comprising:
applying at least part of the transaction data and one or more of the search query terms to a predictive model to determine one or more potential search queries based on one or more of the search query terms; and
generating at least part of the incremental search results data based on the one or more potential search queries.

7. The method of claim 1, further comprising:
receiving a selection of one of the plurality of incremental search results; and
updating the user experience display data with additional customer self-service system content outside of the search text box in the user experience display.

8. The method of claim 1, wherein the results text box is positioned adjacent and below the search text box on user experience display.

9. The method of claim 1, wherein the search algorithm generates the incremental search results data at least partially based on topics of one or more of the search query terms.

10. The method of claim 1, further comprising:
acquiring user profile data representing navigation history of the user in the financial management system; and
applying the user profile data and one or more of the search query terms to a predictive model to identify one or more potential search queries.

11. The method of claim 1, wherein the search algorithm includes a predictive model.

12. The method of claim 11, wherein the predictive model is trained using a training operation selected from a group of predictive model training operations, consisting of:
regression;
logistic regression;
decision trees;
artificial neural networks;
support vector machines;
linear regression;
nearest neighbor methods;
distance based methods;
naive Bayes;
linear discriminant analysis; and
k-nearest neighbor algorithm.

13. The method of claim 1, wherein the customer self-service system content is selected from a group of customer self-service system content, consisting of:
crowd-sourced customer support content;
service provider content;
definitions content, wherein the definitions content includes definitions of tax-specific terms;
suggested potential search queries; and
user tax data for the user.

14. The method of claim 1, wherein the transaction data represents one or more transactions selected from a group of financial management system transactions, consisting of:
recording income from continuing operations;
monitoring accounts receivable;
calculating depreciation;
calculating amortization;
recording taxes paid;
estimating taxes due;
accessing assets values;
determining debts owed;
generating financial reports;
creating invoices;
creating receipts;
recording invoices or receipts;
managing payroll;
tracking inventory;
synchronizing a financial management system account with one or more financial institutions; and
maintaining records of deductible expenses.

15. A financial management system having a customer self-service system that provides incremental search results for search query terms, comprising:
a user experience display that receives transaction data from users of a financial management system, wherein the user experience display provides the transaction data to the users of the financial management system;
a transaction data store that stores transaction data, for the financial management system, in memory allocated for use by the financial management system;
a customer self-service system content store that stores customer self-service system content data, representing customer self-service system content, in memory that is allocated for use by a customer self-service system that provides customer self-service searches for the financial management system;
a search text box configured to receive search query term data representing search query terms from the users, wherein the search query terms constitute at least part of at least one potential search query, wherein the search text box is positioned within the user experience display and proximate to financial management system content provided to the users, the financial management system content being represented by financial management system content;
a result texts box that displays incremental search content data representing incremental search content that the customer self-service system provides in response to the at least one potential search query wherein the results text box is a visually proximate to the search text box in the user experience display; and
a customer self-service system engine configured to apply, as each individual search query term is being entered into the search text box, the search query term data to a search algorithm to generate the incremental search content data, in response to receipt of the search query term data, the incremental search content data including at least part of the transaction data representing one or more transactions for the user in the financial management system and including at least part of the customer self-service system content data representing at least some of the customer self-service system content, the search query terms being further applied by the customer self-service system engine to a predictive model which predicts one or more potential search queries that are based on one or more of the search query terms, the one or more potential search queries being provided to the user through an updated user experience display responsive to additional potential search queries being predicted,
wherein the incremental search content includes one or more transactions for the user in the financial management system and at least some of the customer self-service system content, wherein the incremental search content is displayed in real-time to facilitate viewing of the incremental search content by the user as the user enters the each of the one or more search query terms into the search text box, wherein the results text box is overlaid on other at least part of the financial management system content in the user experience display.

16. The financial management system of claim 15, wherein the results text box is adjacent to and proximate to the search text box.

17. The financial management system of claim 15, wherein the transaction data represents one or more transactions selected from a group of financial management system transactions, consisting of:
  recording income from continuing operations;
  monitoring Accounts Receivable;
  calculating depreciation;
  calculating amortization;
  recording taxes paid;
  estimating taxes due;
  accessing assets values;
  determining debts owed;
  generating financial reports;
  creating invoices;
  creating receipts;
  recording invoices or receipts;
  managing payroll;
  tracking inventory;
  synchronizing a financial management system account with one or more financial institutions; and
  maintaining records of deductible expenses.

18. The financial management system of claim 15, wherein the customer self-service system engine acquires user profile data representing navigation history of a user in the financial management system,
  wherein the customer self-service system engine applies the user profile data and one or more of the search query terms to a predictive model to identify a plurality of potential search queries.

19. The financial management system of claim 15, wherein the search algorithm generates the incremental search content data at least partially based on topics of the one or more search query terms and at least partially based on topics of the customer self-service system content.

20. The financial management system of claim 15, wherein the customer self-service system content is selected from a group of customer self-service system content, consisting of:
  crowd-sourced customer support content;
  service provider content;
  definitions content, wherein the definitions content includes definitions of tax-specific terms;
  suggested potential search queries; and
  user tax data for the user.

21. A system comprising:
  one or more processors; and
  memory having instructions which, when executed by the one or more processors, cause the one or more processors to perform a process for providing domain-specific incremental search results for search query terms with a customer self-service system for a financial management system, the process comprising:
    providing a customer self-service system associated with a financial management system;
    storing, with the customer self-service system, customer self-service system content data representing customer self-service system content, in memory allocated for use by the customer self-service system;
    maintaining transaction data representing financial transactions of users of the financial management system;
    providing search algorithm data representing a search algorithm configured to identify portions of the customer self-service system content and portions of the transaction data associated with search query terms data representing one or more search query terms received in a search text box for the customer self-service system;
    providing search text box data representing the search text box, to enable receipt of the one or more search query terms;
    receiving one or more of the search query terms in the search text box as a portion of one of a number of potential search queries formulated with the one or more search query terms;
    applying, as each individual search query term is being entered into the search text box, search query data representing the one or more of the search query terms to the search algorithm to generate incremental search results data representing a plurality of incremental search results, wherein the plurality of incremental search results includes at least part of the self-service system content and at least part of the transaction data responsive to the one or more of the search query terms, the search query terms being further applied to a predictive model which predicts one or more potential search queries that are based on one or more of the search query terms, the one or more potential search queries being provided to the user through an updated user experience display responsive to additional potential search queries being predicted;
    repeatedly personalizing user experience display data with the incremental search results data, as search query terms are being entered into the search text box, to display the plurality of incremental search results in a results text box positioned adjacent to the search text box in a user experience display represented by the user experience display data, enabling viewing of the plurality of the incremental search results by the user concurrently with the user entering one or more of the search query terms into the search text box, wherein financial management system content appears to be rendered beneath the results text box in the user experience display; and
    transmitting the user experience display data to a user computing system, the user experience display data representing the user experience display.

22. The system of claim 21, wherein the financial management system is a personal financial management system, a business financial management system, or a combination of both the personal financial management system and the business financial management system.

23. The system of claim 21, wherein the customer self-service system is part of the financial management system.

24. The system of claim 21, wherein the user computing system is a mobile computing device and repeatedly updating user experience display data with the incremental search results data facilitates searching the transaction data and the customer self-service system content from the mobile computing device.

25. The system of claim 21, wherein the process further comprises:
  determining one or more potential search queries formable from one or more of the search query terms; and
  generating at least part of the incremental search results data based on the one or more potential search queries.

26. The system of claim 21, wherein the results text box is positioned adjacent and below the search text box on user experience display.

27. The system of claim 21, wherein the process further comprises:

acquiring user profile data representing navigation history of the user in the financial management system; and applying the user profile data and one or more of the search query terms to a predictive model to identify one or more potential search queries.

28. The system of claim 21, wherein the customer self-service system content is selected from a group of customer self-service system content, consisting of:

crowd-sourced customer support content;
service provider content;
definitions content, wherein the definitions content includes definitions of tax-specific terms;
suggested potential search queries; and
user tax data for the user.

29. The system of claim 21, wherein the transaction data represents one or more transactions selected from a group of financial management system transactions, consisting of:

recording income from continuing operations;
monitoring accounts receivable;
calculating depreciation;
calculating amortization;
recording taxes paid;
estimating taxes due;
accessing assets values;
determining debts owed;
generating financial reports;
creating invoices;
creating receipts;
recording invoices or receipts;
managing payroll;
tracking inventory;
synchronizing a financial management system account with one or more financial institutions; and
maintaining records of deductible expenses.

* * * * *